US006970477B2

(12) United States Patent
Chuang et al.

(10) Patent No.: US 6,970,477 B2
(45) Date of Patent: Nov. 29, 2005

(54) DATA TRANSMISSION CIRCUIT AND METHOD

(75) Inventors: Ching-Fu Chuang, Taipei Hsien (TW); Chia-Hsin Chen, Taipei (TW)

(73) Assignee: VIA Technologies Inc., Hsin-Tien (TW)

( * ) Notice: Subject to any disclaimer, the term of this patent is extended or adjusted under 35 U.S.C. 154(b) by 809 days.

(21) Appl. No.: 09/683,647

(22) Filed: Jan. 29, 2002

(65) Prior Publication Data

US 2002/0131439 A1 Sep. 19, 2002

(30) Foreign Application Priority Data

Mar. 16, 2001 (TW) .............................. 90106274 A

(51) Int. Cl.[7] ............................................... H04L 12/54
(52) U.S. Cl. ....................... 370/428; 370/535; 327/407
(58) Field of Search ................................ 370/428, 537, 370/429, 535, 536; 710/22–25, 33, 34, 35; 327/407

(56) References Cited

U.S. PATENT DOCUMENTS 4,303,983 A * 12/1981 Chaborski ................... 702/176
5,701,296 A * 12/1997 Yamauchi ................... 370/282
6,323,756 B1 * 11/2001 Yoshikawa et al. .... 340/310.01

* cited by examiner

*Primary Examiner*—Ajit Patel
(74) *Attorney, Agent, or Firm*—Winston Hsu

(57) ABSTRACT

A data transmission circuit has an internal circuit for providing data, a register electrically connected to the internal circuit for temporarily storing the data transmitted from the input internal circuit, and a control circuit for controlling operations of the data transmission circuit. If data inputted to the register is specific data, the internal circuit will repeatedly output the specific data to the register so as to prolong transmission time of the specific data.

12 Claims, 7 Drawing Sheets

DATA TRANSMISSION CIRCUIT AND METHOD

BACKGROUND OF INVENTION

1. Field of the Invention

The present invention relates to a data transmission circuit and method for transmitting data. More specifically, the present invention shows a data transmission circuit and method for decreasing signal interference on a data bus.

2. Description of the Prior Art

Generally speaking, microprocessor systems processing large amounts of data with high speed all have more than one data processing unit. Some data processing units such as a memory are used to store data. Others such as a central processing unit are used to operate and process data. Moreover, data processing units are used to coordinate data exchange between other data processing units. For example, a north bridge chip on a motherboard of a computer system is used to coordinate data exchange among the central processing unit, the memory, a graphic accelerator, and a south bridge chip. To exchange data with other data processing units for completing the whole function of a microprocessor system, each data processing unit is connected via a data bus. Each data processing unit uses a data transmission circuit to electrically connect to the data bus to send or receive data on the data bus.

Please refer to FIG. 1. FIG. 1 is a schematic diagram of two data processing units 14 and 16 exchanging data through a data bus 12 in a typical microprocessor system 10. The microprocessor system 10 comprises two data processing units 14 and 16. Two data transmission circuits 18 and 20 are installed within the respective data processing units 14 and 16, and are electrically connected to both ends of the data bus 12 to handle data exchanges between the data processing units 14 and 16.

Please refer to FIG. 2. FIG. 2 is a block diagram of a prior art data transmission circuit 22. The data transmission circuit 22 comprises an internal circuit 24, a register 28, an output circuit 32, and a control circuit 34. The internal circuit 24 is electrically connected to the register 28, the register 28 is electrically connected to the output circuit 32, and the output circuit 32 is electrically connected to the data bus 12. The control circuit 34 controls the operation of the whole data transmission circuit 22 and is electrically connected to the register 28 and the output circuit 32. The internal circuit 24 has a data output level 26 for providing data, and the register 28 has a D flip-flop 30 for temporarily storing data. A clock signal controlling the D flip-flop 30 is supplied by the control circuit 34. If data is requested to be sent on the data bus 12 from the data transmission circuit 22, the data is transmitted to the register 28 from the data output level 26 of the internal circuit 24 first. After being triggered by the clock signal, the D flip-flop 30 sequentially transmits data to the output circuit 32 from the internal circuit 24. Then, the output circuit 32 outputs the data on the data bus 12 to complete the task of the data transmission circuit 22 transmitting data to the data bus 12.

After the data is transmitted to the data bus 12, the control circuit 34 controls the output circuit 32 with a control signal to disconnect with the data bus 12 so that the data bus 12 is in a floating state. When the data bus 12 is in the floating state, the data transmission circuit 22 either waits for another data transmission circuit connected to the other end of the data bus 12 to transmit data, or readies to transmit data through the data bus 12. For all data transmission circuits electrically connected to the data bus 12, while the data bus 12 is in the floating state, a turn-around cycle can be supplied to prevent interference on the data bus 12 and prevent a phenomenon of signal contention. After the data transmission circuit finishes transmitting data, the output circuit 32 usually disconnects with the data bus for a period of time.

As mentioned above, closing the data bus 12 helps to coordinate the transmitting of data between each data transmission circuit. Nevertheless, there is still a delay period from when the control circuit 34 sends a control signal to when the output circuit 32 totally disconnects with the data bus 12. In this delay period, the data transmission circuit 22 still transmits data to the data bus 12 through the output circuit 32. If the content of the data bus is changed (such as from high-level to low-level, or low-level to high-level) during the delay period, and then disconnected, it can be seen as an impulse signal transmitting on the data bus under the floating state. To get a more detailed understanding, please refer to FIG. 3. FIG. 3 is a timing diagram signals on nodes A, B, D, T, E in the data transmission circuit 22 shown in FIG. 2. A horizontal axis in FIG. 3 represents time. A signal 40 is a waveform of the clock signal on node T, and the control circuit 34 uses the clock signal to control the D flip-flop 30. Signal 42 represents data transmitted to the D flip-flop 30 from the data output level 26. Data packets 50, 52, 54, 56 are data that will be transmitted to the data bus 12 from the data transmission circuit 22. The D flip-flop 30 is triggered by the rising edge of the clock signal, and the data packets 50, 52, 54, 56 are transmitted to the output circuit 32 and are represented as data packets 50*a*, 52*a*, 54*a*, 56*a* in signal 44 on node B. At this time, please note that the control circuit 34 also uses a control signal 46 (on node E) to control the output circuit 32. When data packets 50*a*, 52*a*, 54*a*, 56*a* are transmitted to the output circuit 32, the signal 46 remains at a high level. Therefore, the four packets of data can be transmitted to the data bus 12, as shown on signal 48 of node D on the data bus 12. Data packets 50*b*, 52*b*, 54*b*, 56*b* in the signal 48 respectively correspond to data packets 50*a*, 52*a*, 54*a*, 56*a* in the signal 44. After transmitting the four packets of data, the control circuit 34 then changes the control signal 46 to a low-level from a high-level. In this way, the output circuit 32 disconnects with the data bus 12. Please note that the signal 42 has a follow-up data packet 58 after data packet 56. The data packet 58 is data transmitted from the data output level 26 contiguously, but the data packet 58 is not transmitted with the data packets 50, 52, 54, 56. The data packet 58 is transmitted to the output circuit 32 by the D flip-flop 30 when triggered by the clock signal. This is the case with data packet 58*a* in the signal 44. If the control signal 46 is immediately pulled low at the point of 60, the data packet 58*a* will still be transmitted to the data bus 12 because of the delay period, as shown with the data packet 58*b* in the signal 48. In the delay period, the data bus 12 still receives a small piece of data packet 58*b* from the output circuit 32, as the marked area 62 in the signal 48. In the delay period time, if contents of the data packet 56*b* and the data packet 58*b* are different, the signal level on the data bus 12 will be changed. However, the signal level is not changed to a stable state and the data bus 12 has been totally disconnected so that the signal 48 in the area 62 is an impulse signal. Since the data bus 12 is disconnected and in a floating state, two ends of the data bus 12 are equivalent to an open state. The impulse signal will be reflected by both ends of the route and will be transmitted back and forth on the data bus 12 continuously. Once the data bus 12 reconnects to transmit data, the impulse signal will interfere with the normal data transmission on the data bus 12, and then the operation of the whole microprocessor system is affected.

To solve the problem of the impulse signal, one solution of the prior art method is to disconnect the data bus 12 earlier. Please refer to FIG. 4 of a timing diagram of each node. The legend of FIG. 4 is the same as that of FIG. 3. Signals 64, 66, 68, 70, 72 are respective signals on nodes T, A, B, E, D in the data transmission circuit in FIG. 2. Data packets 74, 76, 78, 80 in the signal 66 are four pieces of data that are transmitted to the data bus 12. To prevent generation of the impulse signal, the control circuit 34 controls the output circuit 32 to disconnect the data bus 12 by pulling the control signal low at the point of 82. Because the data packet 80*a* in the signal 68 (on node B) has not completed a cycle, this ensures that the data packet 84*a* following the data packet 80*a* is not transmitted to the data bus. However, this shortens the cycle of the data packet 80*a*.

Another prior art method to prevent the impulse signal is described with FIG. 5. Please refer to FIG. 5 of a timing diagram of each node signal in another prior art method of preventing generation of the impulse signal. The legend of FIG. 5 is the same as those of FIG. 3 and FIG. 4. The horizontal axis is time, and signals 85, 86, 88, 90, 92 are respective signals on nodes T, A, B, E, D in FIG. 2. Data packets 94, 96, 98, 100 in the signal 86 are transmitted. In the prior art method, the control circuit 34 delays the time for sending the control signal 90 at the point of 102. After the last data packet 100*a* of the signal 88 (on node B) is transmitted, more than half the cycle time of the signal 85 is spent waiting. Then the control signal 102 controls the control circuit 32 to disconnect the data bus 12. This way allows data packet 104*a* to reach a stable state in a half cycle of the signal 85 and disconnect the data bus 12 to prevent the impulse signal from being generated. Since the data packet 104*b* in the signal 92 will not be transmitted, the prior art method will not affect the four packets of data (i.e. data packets 94*b*, 96*b*, 98*b*, 100*b* in the signal 92) and avoids generating the impulse signal. The key to the prior art method is that the data packet 104*a* reaches a stable state in the half cycle of the signal 85. If the data packet 104*a* cannot reach a stable state in the half cycle of the signal 85, the generation of impulse signal cannot be prevented. By improving the art, the operating frequency of each data processing unit in the microprocessor system 10 increases, and the cycle of the signal 85 becomes very short. Therefore, in high-speed microprocessor systems, the data 104*a* cannot reach a stable state in the half cycle of the signal 85, and the impulse signal is still generated.

SUMMARY OF INVENTION

It is therefore a primary objective of the claimed invention to provide a data transmission circuit to solve the above-mentioned problems.

According to the claimed invention, the data transmission circuit comprises an internal circuit for providing data, a register electrically connected to the internal circuit for temporarily storing the data transmitted from the internal circuit, and a control circuit for controlling operation of the data transmission circuit. If data inputted to the register is a specific data, the internal circuit will repeatedly output the specific data to the register so as to prolong transmission time of the specific data.

It is an advantage of the claimed invention that the data transmission circuit can prevent the impulse signal signals from being generated even on a high-speed data bus.

These and other objectives and advantages of the claimed invention will no doubt become obvious to those of ordinary skill in the art after having read the following detailed description of the preferred embodiment that is illustrated in the various figures and drawings.

DETAILED DESCRIPTION

Figure 1:
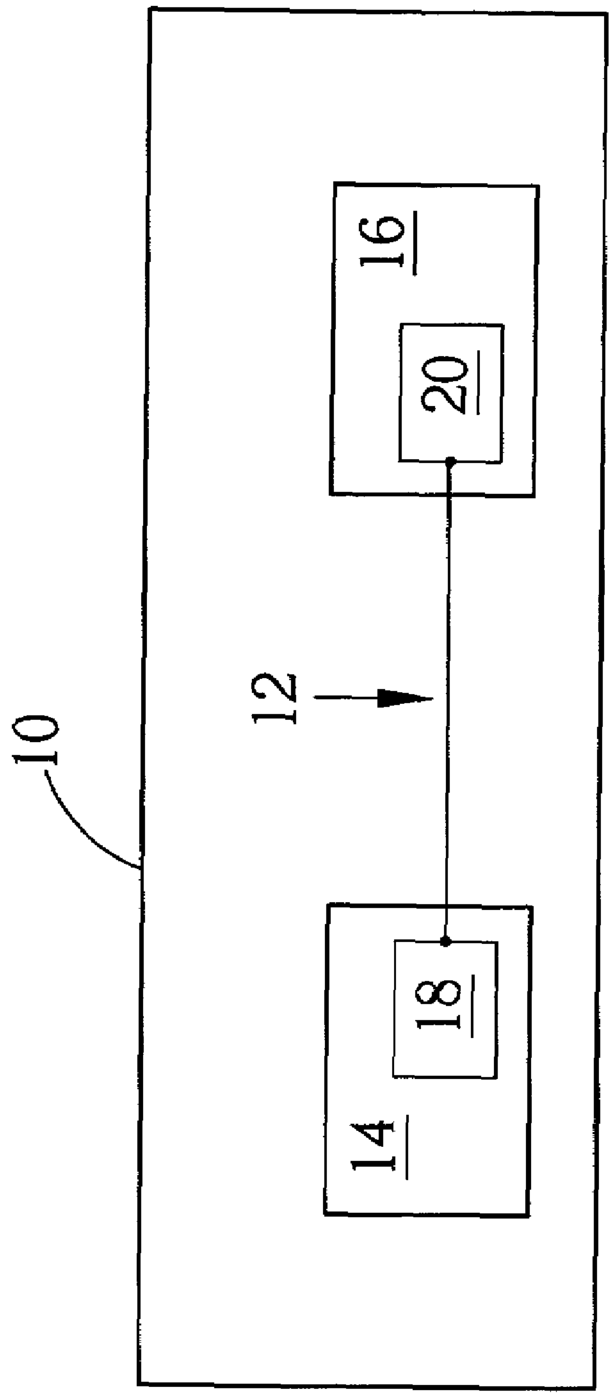
FIG. 1 is a diagram of two data processing units exchanging data with a data bus in a microprocessor system.
Figure 2:
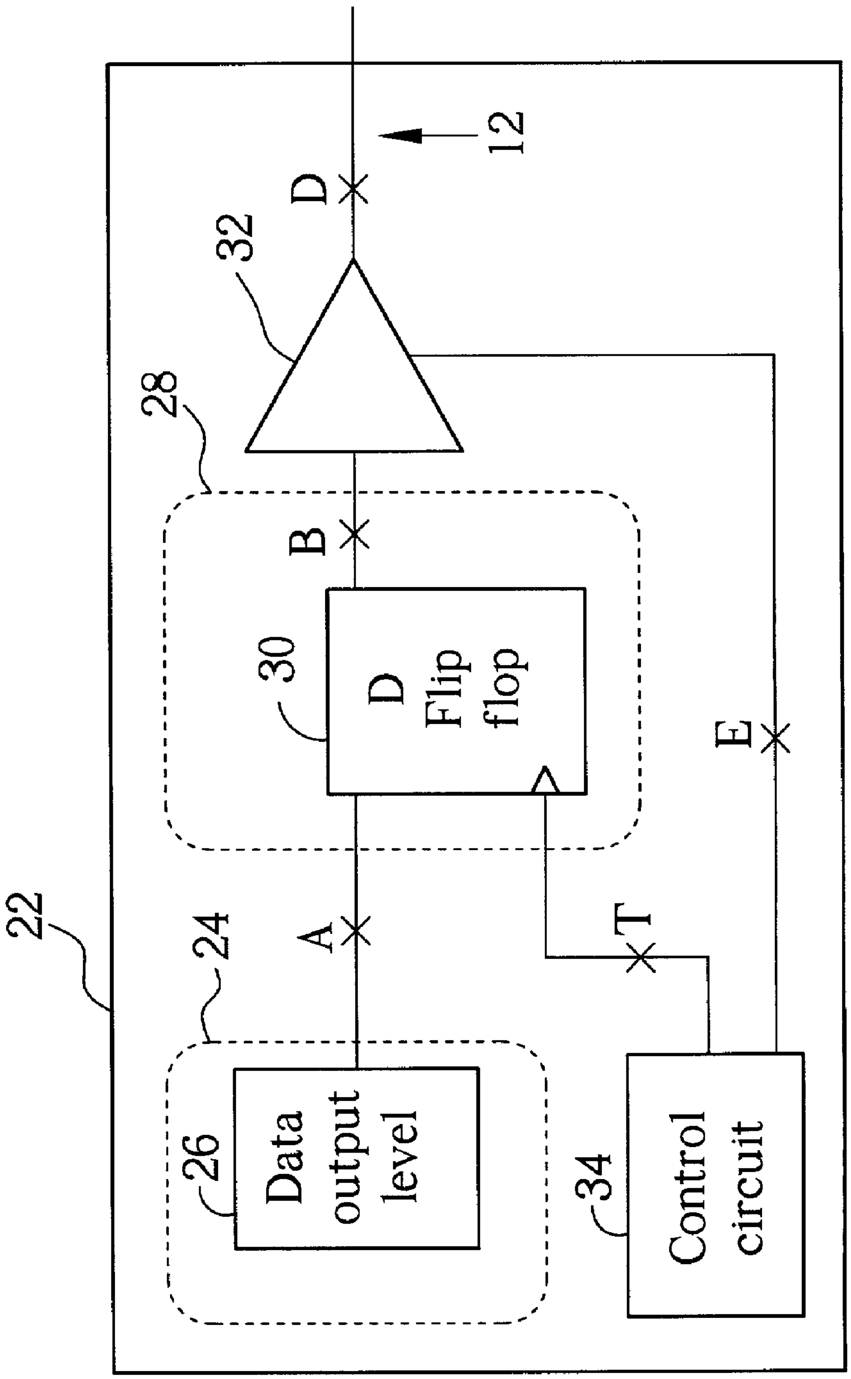
FIG. 2 is a block diagram of a prior art data transmission circuit.
Figure 3:
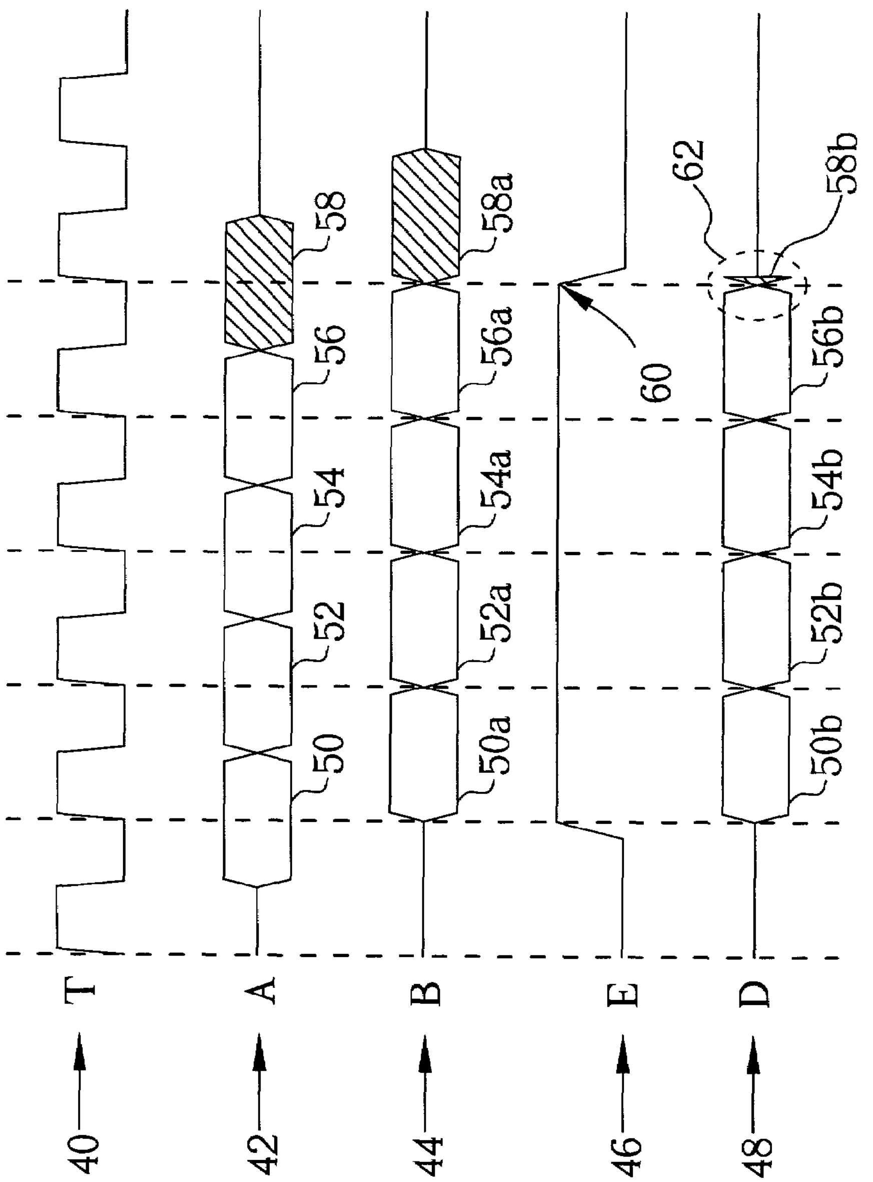
FIG. 3 is a timing diagram of each signal on nodes when the prior art data transmission circuit shown in FIG. 2 operates.
Figure 4:
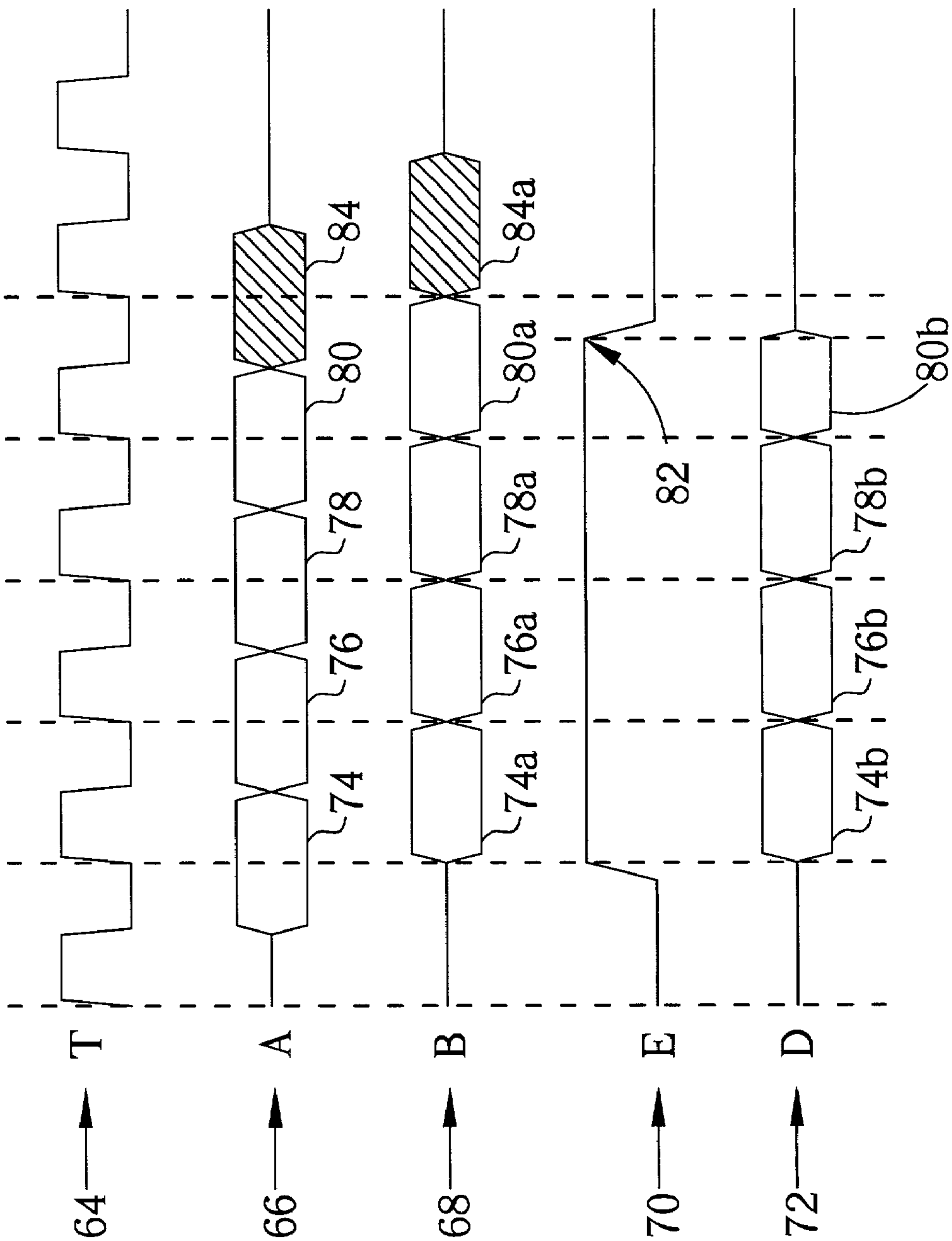
FIG. 4 is a timing diagram of each node signal when the prior art data transmission circuit shown in FIG. 2 operates with a second method.
Figure 5:
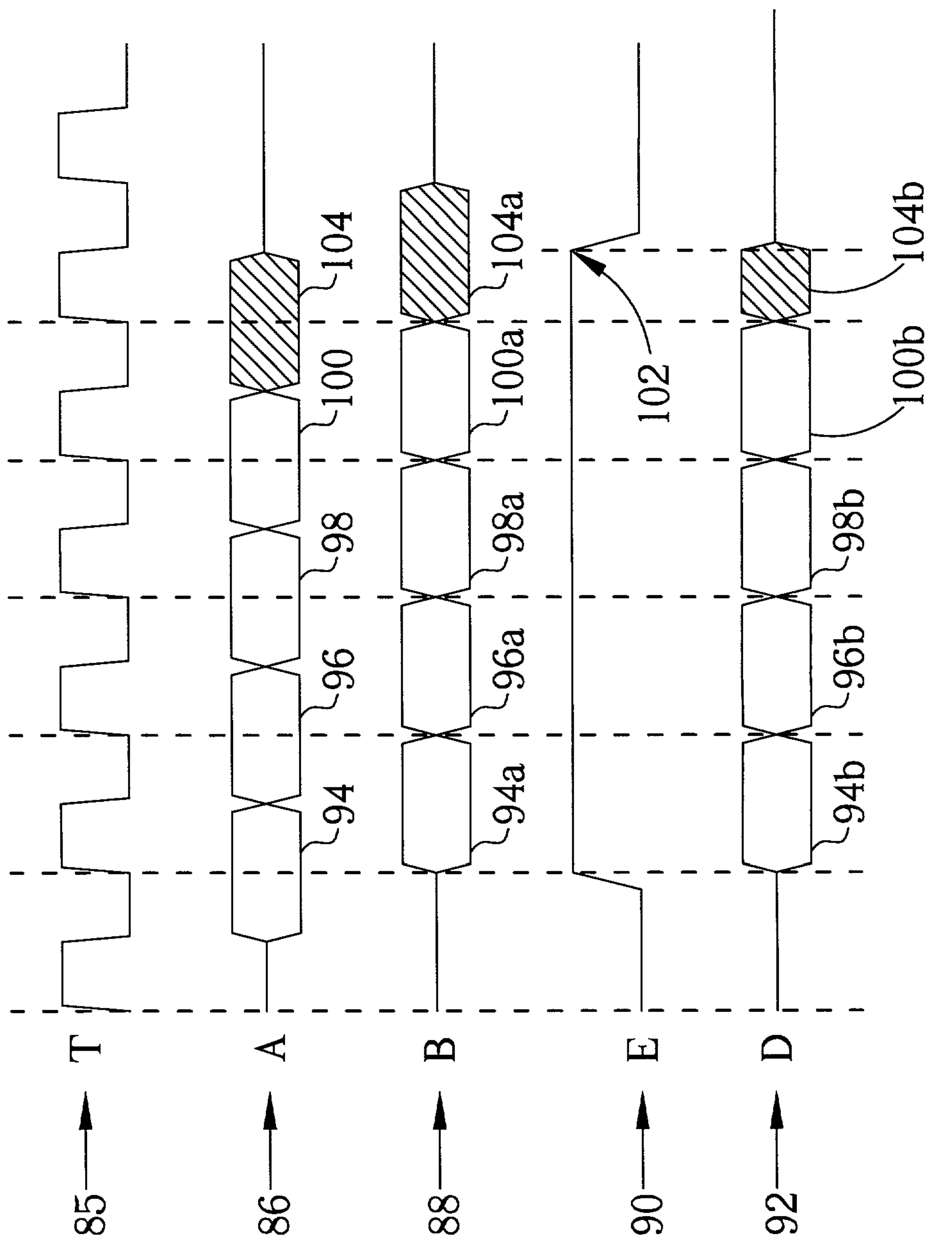
FIG. 5 is a timing diagram of each node signal when the prior art data transmission circuit shown in FIG. 2 operates with a third method.
Figure 6:
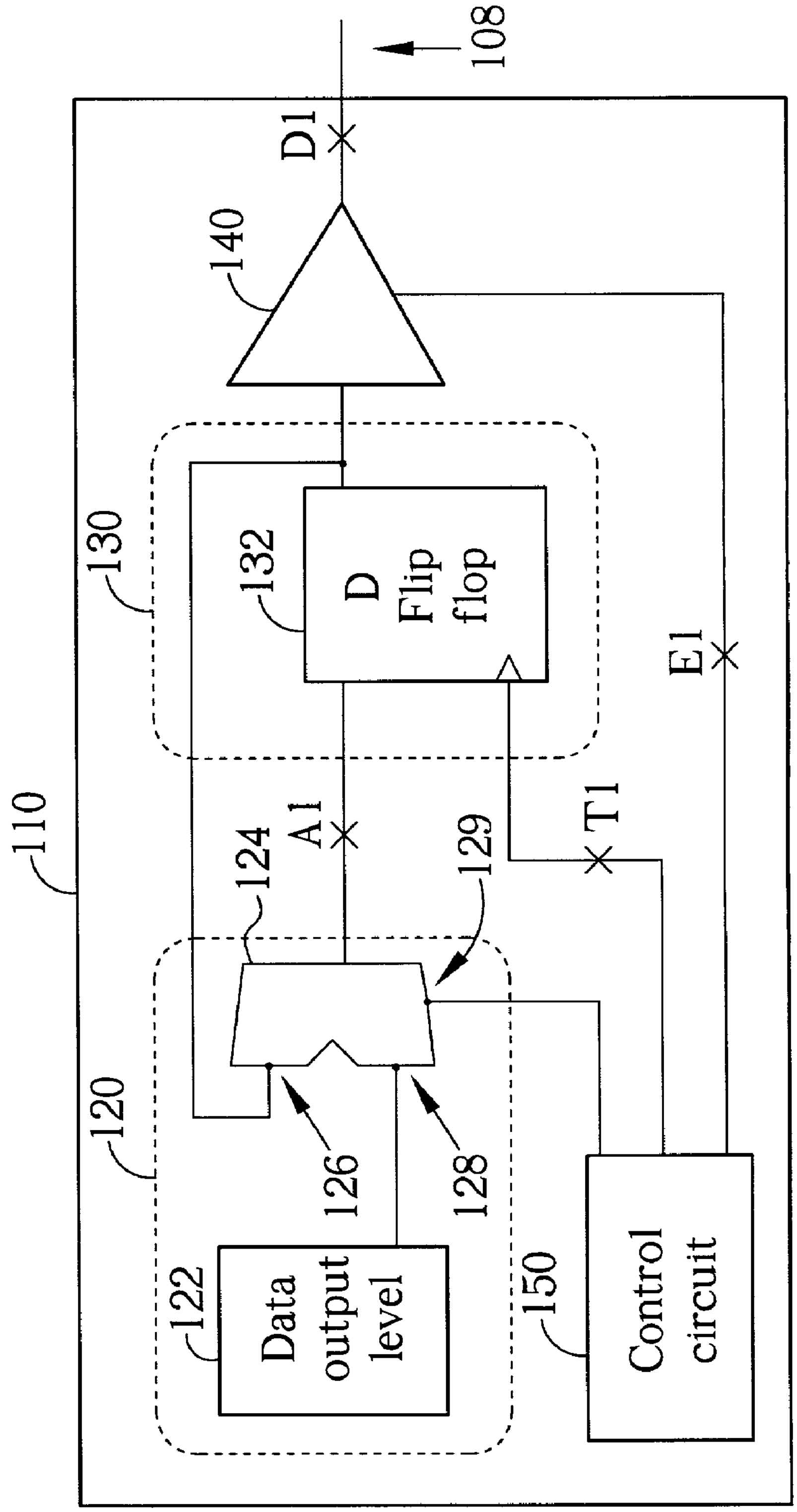
FIG. 6 is a block diagram of the present invention data transmission circuit.

Please refer to FIG. 6 of a block diagram of the present invention data transmission circuit 110. The data transmission circuit 110 comprises an internal circuit 120, a register 130, an output circuit 140, and a control circuit 150. The internal circuit 120 has a data output level 122 and a multiplexer 124. The multiplexer 124 has a first input end 126, a second input end 128, and a selecting end 129. The second input end 128 is electrically connected to the data output level 122, and the selecting end 129 is electrically connected to the control circuit 150. The register 130 has a D flip-flop 132. An input end of the D flip-flop 132 is electrically connected to an output end of the multiplexer 124 and an output end of the D flip-flop 132 is electrically connected to the output circuit 140. The output end of the D flip-flop 132 also has a feedback route electrically connected to the first input end 126 of the multiplexer 124. The output circuit 140 is electrically connected to a data bus 108 to transmit data to the data bus 108. The control circuit 150 is electrically connected to the selecting end 129 of the multiplexer 124, the D flip-flop 132, and the output circuit 140, to control the operations of these function blocks. The control circuit 150 uses a selecting signal to control the multiplexer 124 so that the multiplexer 124 outputs the signal inputted from the first input end 126 or the second input end 128.

Figure 7:
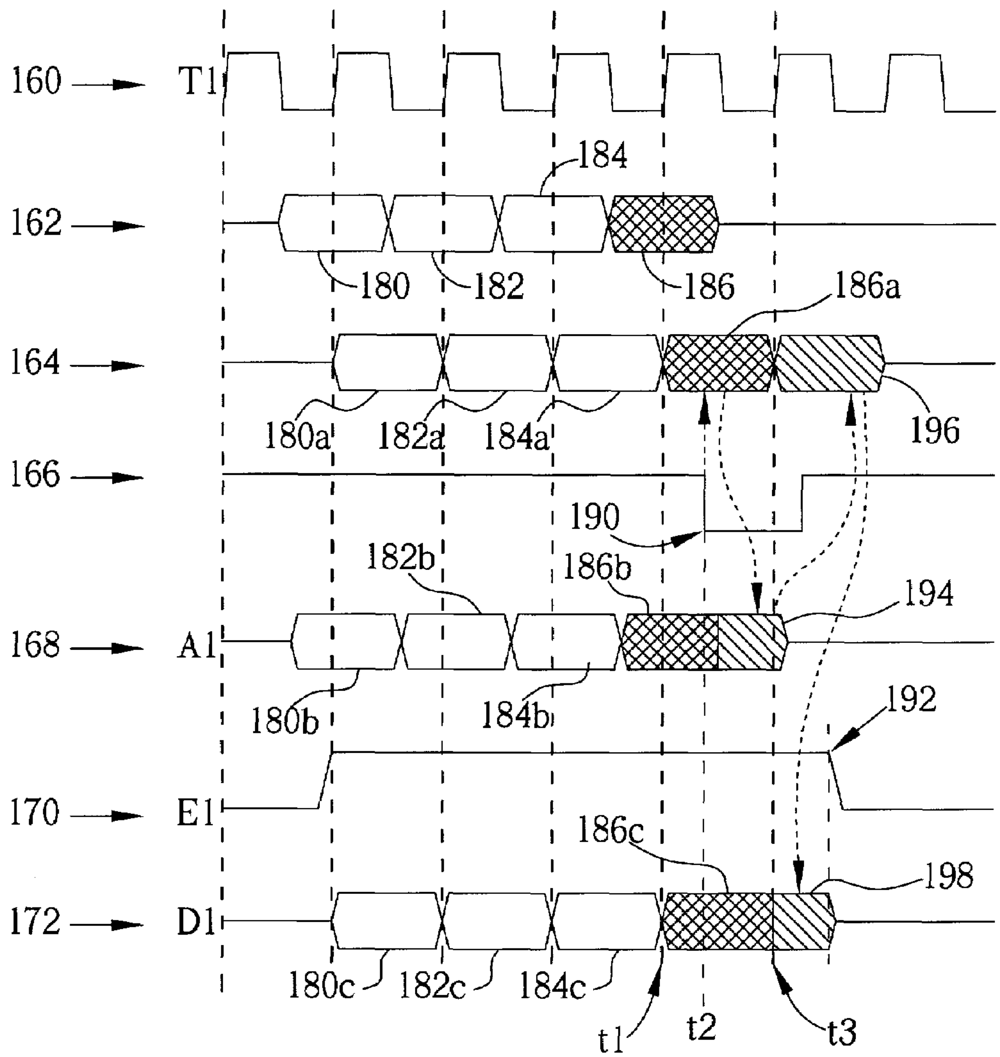
FIG. 7 is a timing diagram of each signal on nodes when the data transmission circuit shown in FIG. 6 operates.

The operation and principle for preventing the impulse signal of the present invention data transmission circuit 110 is described in the timing diagram of FIG. 7. Please refer to FIG. 7 of a timing diagram of each signal on nodes of the data transmission circuit 110 shown in FIG. 6. The horizontal axis of FIG. 7 is time. Signals 160, 162, 164, 166, 168, 170, 172 are respective signals on node T1, the second input end 128, the first input end 126, the selecting end 129, node A1, node E1, and node D1. When the data transmission circuit 110 operates, the control circuit 150 controls the operation of the D flip-flop with the clock signal 160. Data to be transmitted is inputted to the second input end 128 of the multiplexer 124 from the data output level 122 first. Data packets 180, 182, 184, and 186 in the signal 162 on the second input end 128 are four packets of data to be transmitted to the data bus 108. The data packet 186 is the last packet to be transmitted.

When data packet 180 is transmitted to the second input end 128 from the data output level 122, the control circuit 150 inputs the high-level signal of the selecting signal 166 into the selecting end 129 of the multiplexer 124. The high-level signal makes the multiplexer 124 output the signal inputted from the second input end 128. Hence, the signal inputted to the second input end 128 from the data output level 122 is outputted to the D flip-flop 132, as with the signal 168 on node Al. When the selecting signal 166 is in a high state, the signal 168 outputted to the D flip-flop by the multiplexer 124 is the signal 162 inputted from the second input end 128. The data packets 180, 182, 184 in the signal 162 become respective data packets 180*b*, 182*b*, 184*b* in the signal 168. After the data is transmitted to the D flip-flop 132, the D flip-flop 132 transmits the data to the output circuit 140 according to the rising edge of the clock signal 160 sent from the control circuit 150. Please note that in the present invention data transmission circuit 110, the output end of the D flip-flop 132 is not only electrically connected to the output circuit 140, but also electrically connected to the first input end 126 of the multiplexer 124. In this way, the signal 164 on the first input end 126 is also the signal transmitted to the output circuit 140 from the D flip-flop 132. The data packets 180*a*, 182*a*, 184*a* in the signal 164 are respective data outputted by the D flip-flop 132. At this time, the selecting signal 166 used to control the multiplexer 124 in the control circuit 150 remains at a high level, so the signal 168 outputted by the multiplexer 124 is from the second input end and has no relationship with the first input end 126. When the data packet 180*a* in the signal 164 starts to be transmitted to the output circuit 140, the control circuit 150 controls the output circuit 140 to connect with the data bus 108 through a high-level in the control signal 170 on the node E1. Therefore, the signal 164 can be transmitted to the data bus 108 from the output circuit 140, shown as the signal 172 of the node D1 on the data bus 108. The data packets 180*c*, 182*c*, 184*c* in the signal 172 become the data packets 180*a*, 182*a*, 184*a* in the signal 164, respectively.

When the last data packet 186 starts to transmit to the multiplexer 124, the control circuit 150 still controls the multiplexer 124 to choose the signal inputted from the second input end 128. The last data packet 186 in the signal 162 becomes the data packet 186*b* in the signal 168 after being outputted by the multiplexer 124.

At time t1, the data packet 186*b* in the signal 168 is transmitted to the output circuit 140 (please refer to the horizontal axis in FIG. 7), and at the same time, it feeds back to the first end 126 of the multiplexer 124, shown by the data packet 186*a* in the signal 164. The data packet 186*a* in the signal 164 is the same as the data packet 186*c* in the signal 172 during the period between t1 and t2.

At time t2, the control circuit 150 controls the multiplexer 124 by using the selecting signal 166 with a low-level at the point of 190 so that the multiplexer 124 outputs the signal 164 of the first input end 126. During the low level period of the selecting signal 166, the content of the signal 164 is simply the content of the data packet 186*a*. The content of the data packet 186*a* is outputted by the multiplexer 124 and becomes data packet 194 in the signal 168 on node A1. Please note that the content of the data packet 194 is completely the same as the content of the last data packet 186. After being triggered by the rising edge of the clock signal 160 at time t3, the D flip-flop 132 will transmit the data packet 194 in the signal 168 to the output circuit 140, shown by the data packet 196 in the signal 164. The data packet 196 in the signal 164 becomes the data packet 198 in the signal 172 of the node D1 on the data bus through the output circuit 140. After time t3, all the four data packets are transmitted to the data bus 108. Additionally, the content of the last data packet 186 will repeat in the data 198 on the signal 172. Likewise, the transmission time on the data bus 108 of the last data packet 186 is extended (originally, the transmission time of each data packet is equal to a timing cycle of the clock signal 160). After time t3, the control circuit 150 can use the low-level control signal 192 in the signal 170 to control the output circuit 140 to disconnect the data bus 108 at any time, and is not affected by the impulse signal on the data bus.

By extending the transmission time of the last data packet 186, the present invention data transmission circuit 110 can avoid generating the impulse signal on the data bus. In the prior art, the impulse signal is generated during the period between the data bus starting to disconnect and being totally disconnected. The present invention data transmission circuit can extend the transmission time of the last data packet 186 and disconnect with the data bus during the extending transmission time. Even if the time needed by the data bus to be totally disconnected is longer, the content of the data will not be changed during the time of disconnecting the data bus. Therefore, the present invention data transmission circuit 110 can avoid producing impulse signals on the data bus and ensure that each data processing unit of the whole microprocessor system exchanges data smoothly and correctly.

The spirit of the present invention data transmission circuit is to extend the transmission time of the last data packet to be transmitted. In this way, the content of the data on the data bus is identical during the time when the data bus starts to be disconnected to being totally disconnected to prevent generation of impulse signals on the data bus. In the actual circuit, the present invention data transmission circuit uses a multiplexer to control a feedback route to achieve the objective of extending the transmission time of the specific data and reducing the noise interference on the data bus. One of the advantages of the present invention is suitability for transmitting high-speed data. For example, the present invention could be used in the north bridge chips used to control data transmission between the CPU (Central Processing Unit with memory such as RAM (Random Access Memory) on the motherboard in normal computers.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data transmission circuit for transmitting data comprising:

an internal circuit for providing data;

a register electrically connected to the internal circuit for temporarily storing the data transmitted from the internal circuit; and a control circuit for controlling operations of the internal circuit and the register;

wherein if data inputted to the register is a specific data, the internal circuit will repeatedly output the specific data to the register so as to prolong transmission time of the specific data.

2. The data transmission circuit of claim 1 further comprising an output circuit electrically connected to the register for outputting the data transmitted from the register.

3. The data transmission circuit of claim 2 wherein the register comprises a D flip-flop for outputting data transmitted from the internal circuit to the output circuit and feeding back the data to the internal circuit.

4. The data transmission circuit of claim 2 wherein when the internal circuit repeatedly outputs the specific data to the register, the register will prolong the time that the specific data is outputted to the output circuit, and when the register prolongs the time that the specific data outputted to the output circuit, the control circuit will output a control signal to terminate the register from outputting the specific data to the output circuit.

5. The data transmission circuit of claim 1 wherein the internal circuit comprises a multiplexer, the multiplexer comprising:

a first input end electrically connected to an output end of the register for inputting data outputted by the register;

a second input end for inputting data to be transmitted by the data transmission circuit; and a selecting end electrically connected to the control circuit for receiving a selecting signal transmitted from the control circuit.

6. The data transmission circuit of claim 5 wherein when the second input end receives the specific data and the multiplexer has transmitted the specific data to the register, the control circuit will transmit the selecting signal to the control end so that the multiplexer will continue to output the specific data to the register.

7. The data transmission circuit of claim 5 wherein the specific data is a last data packet within a plurality of data packets successively inputted to the second input end.

8. The data transmission circuit of claim 1 being formed on a north bridge chip of a motherboard.

9. A data transmission method of a data transmission circuit, the data transmission circuit comprising:

an internal circuit for providing data;

a register electrically connected to the internal circuit for temporarily storing data transmitted from the internal circuit; and a control circuit for controlling operations of the internal circuit and the register;

the method comprising:

when data inputted to the register by the internal circuit is specific data, the specific data being repeatedly transmitted to the register to prolong transmission time of the specific data.

10. The data transmission method of claim 9 further comprising:

for prolonging transmission time of the specific data, the control circuit transmitting a control signal to terminate transmission of the specific data.

11. The data transmission method of claim 9 wherein the specific data being a last data packet of a plurality of data packets gets successively inputted to the register.

12. The data transmission method of claim 9 wherein the data transmission circuit is located on a north bridge of a motherboard.

* * * * *